UNITED STATES PATENT OFFICE.

IWAN OSTROMISLENSKY, OF PETROGRAD, RUSSIA, ASSIGNOR, BY MESNE ASSIGN-
MENTS, TO NEW YORK BELTING AND PACKING COMPANY, A CORPORATION OF
NEW YORK.

PROCESS FOR VULCANIZING RUBBER AND PRODUCTS OBTAINED THEREBY.

1,249,181.     Specification of Letters Patent.     Patented Dec. 4, 1917.

No Drawing. Original application filed July 29, 1916, Serial No. 112,187. Divided and this application filed November 24, 1916. Serial No. 133,133.

*To all whom it may concern:*

Be it known that I, IWAN OSTROMISLEN-SKY, a subject of the Czar of Russia, residing at Petrograd, Russia, have invented certain new and useful Improvements in Processes for Vulcanizing Rubber and Products Obtained Thereby, of which the following is a full, clear, and exact description.

This invention relates to processes for vulcanizing rubber or similar material such as gutta-percha, balata, synthetic rubber, and materials commonly classed under the term "rubber" and to the products obtained thereby. It is more particularly directed to a process in which the use of sulfur or sulfur compounds as vulcanizing ingredients may be eliminated; and to the products resulting therefrom.

The vulcanization of rubber, according to the practice heretofore followed, is performed by the use of sulfur or a sulfur containing compound. Other methods which have been proposed employ halogens or sulfur-free halogen compounds, *e. g.* hypochlorous acid, hypochlorites, bromin, iodin, etc. Mention of these materials rarely occurs, however, outside of the literature, and according to such statements as appear in the literature they act to produce only hard rubber, resembling ebonite. The commercial importance, therefore, of other processes than those employing sulfur is practically negligible. Vulcanization by sulfur, dominates the field. The use of sulfur alone according to the present well-known processes is open to some objections which it is the object of the present invention to overcome. Where sulfur alone is employed the vulcanization must be effected by the action of a high degree of heat. Where sulfur chlorid is used in cold-curing the process is troublesome and requires special precautions in the use and handling of sulfur chlorid. Articles vulcanized by sulfur age somewhat rapidly. Further unavoidable excess of sulfur sometimes occurs in articles so vulcanized to the detriment thereof—for example, the color of the article is affected and the life shortened—to remedy which a supplementary process of airing must be resorted to which lengthens the process of cure. The range of colors obtainable in rubber vulcanized by sulfur is limited, the majority of organic dyes under the conditions heretofore pertaining tending to change color.

The principal object of the present invention accordingly is to provide a simple and efficient process which by obviating the use of sulfur or sulfur compounds partially or entirely as the vulcanizing agent shall do away with various disadvantages noted in the use thereof. Another object is to provide a series of products having a wide range of desirable physical characteristics employing a vulcanizing agent or agents eliminating sulfur or sulfur compounds.

This is a division of my co-pending application Serial No. 112,187, filed July 29, 1916.

In carrying out the process in its preferred form 20 grams of rubber are mixed with 4-20% of benzoyl peroxid. The mixture is placed in the vulcanizing press and heated under thirty pounds steam pressure for approximately fifteen minutes and when removed from the press complete vulcanization is found to have taken place. It will be noted that the various other forms of cure applicable for sulfur vulcanization are applicable here.

The rubber produced by the process is soft and is generally applicable where soft rubbers produced by sulfur vulcanization have been used. The product possesses high tensile strength among other desirable physical characteristics and shows marked resistance to aging. Further, the product is translucent and nearly transparent in layers approximately one-eighth inch thick.

According to my theory the action of benzoyl peroxid in effecting vulcanization is secured through the activity of one or more of the oxygen atoms thereof and it has been found in general that substances like benzoyl peroxid may be employed with similar results. For example, various peracids such as perbenzoic acid and the like may be used.

It will be observed that the process mentioned is applicable not only to natural rubber but may be applied to various synthetic rubbers. For example, tests carried out with di-methylerythrene and normal erythrene produced good results.

The process of vulcanization may be also carried out without the application of the vulcanizing heat employed above, that is, steam under thirty pounds pressure. Such process is preferably carried out as follows:—20 grams of natural rubber are mixed with 4-20% of benzoyl peroxid, the mixture being accomplished at normal temperature. The mixture is given a careful preliminary warming at a temperature below 100° C. preferably from 30 to 80° C. for a period varying from ten to forty minutes in the absence of air. Upon standing at normal temperature vulcanization becomes complete.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material which comprises adding a peroxy compound thereto and inducing vulcanization to take place under the action thereof.

2. A process for treating rubber or similar material which comprises adding an organic peroxy compound thereto and inducing vulcanization to take place by the action thereof.

3. A process for treating rubber or similar material which comprises adding a peroxid thereto and inducing vulcanization to take place under the action of said peroxid.

4. A process for treating rubber or similar material which comprises adding an organic peroxid thereto, and inducing vulcanization to take place under the action of said peroxid.

5. A process for treating rubber or similar material which comprises adding benzoyl peroxid thereto and inducing vulcanization to take place under the action thereof.

6. A process for treating rubber or similar material which comprises adding a peroxy compound thereto and vulcanizing the mixture at a temperature below 100° C.

7. A process for treating rubber or similar material which comprises adding a peroxid thereto and vulcanizing the mixture at a temperature below 100° C.

8. A process for treating rubber or similar material which comprises adding peroxid thereto, preliminarily warming the mixture and vulcanizing the mixture at substantially normal temperature.

9. A process for treating rubber or similar material which comprises adding an organic peroxid thereto, preliminarily heating the mixture to 30 to 80° C. and vulcanizing the mixture at substantially normal temperature.

10. A process for treating rubber or similar material which comprises adding benzoyl peroxid thereto, preliminarily heating the mixture to a temperature below 100° C. and vulcanizing the mixture at substantially normal temperature.

11. As a new compound a vulcanized rubber containing products of the action of a vulcanizing agent comprising a peroxy compound.

12. As a new compound a vulcanized rubber containing products of the action of a vulcanizing agent comprising an organic peroxid.

13. As a new compound a vulcanized rubber comprising products of the action at a temperature below 100° C. of a vulcanizing agent comprising a peroxid.

Signed at Petrograd, Russia, this 17 day of November, 1916.

IWAN OSTROMISLENSKY.